United States Patent
Faruque

[19]

[11] Patent Number: 5,883,889
[45] Date of Patent: Mar. 16, 1999

[54] DIRECTIONAL PSEUDONOISE OFFSET ASSIGNMENT IN A CDMA CELLULAR RADIOTELEPHONE SYSTEM

[75] Inventor: Saleh Faruque, Plano, Tex.

[73] Assignee: Northern Telecom Limited, Montreal, Canada

[21] Appl. No.: 796,828

[22] Filed: Feb. 6, 1997

[51] Int. Cl.[6] .............................. H04B 7/216; H04J 13/00
[52] U.S. Cl. ........................................... 370/335; 455/446
[58] Field of Search .................................... 370/208, 328, 370/329, 335, 342, 441, 479; 375/200, 206, 208, 367; 455/422, 446, 447, 448, 449

[56] References Cited

U.S. PATENT DOCUMENTS

| | | | |
|---|---|---|---|
| 5,430,761 | 7/1995 | Bruckert et al. .................. | 375/200 |
| 5,649,292 | 7/1997 | Doner ................................ | 455/447 |
| 5,715,236 | 2/1998 | Gilhousen et al. ................ | 370/209 |
| 5,734,983 | 3/1998 | Faruque ............................. | 455/447 |
| 5,802,474 | 9/1998 | Faruque ............................. | 455/447 |

Primary Examiner—Chi H. Pham
Assistant Examiner—Ricky Q. Ngo
Attorney, Agent, or Firm—Kenneth W. Bolvin; W. Glen Johnson; John D. Crane

[57] ABSTRACT

The present invention is based on a tri-cellular grouping of three identical cells. Each cell of the tri-cellular group is driven by a directional antenna that radiates the cell from the center of the group. Multiple tri-cellular groups make up a cellular system having three axes at 0°, 120°, and 240°. Each axis is comprised of seven total layers, one layer being a repeat of another of the layers. The 512 available system PN offsets are divided up into three groups of 24 offsets, one group for each axis. Each PN offset group is reused only in the direction to which it is assigned.

16 Claims, 4 Drawing Sheets

|        | 0°  |     |     |     | 120° |     |     |     | 240° |     |     |     |
|--------|-----|-----|-----|-----|------|-----|-----|-----|------|-----|-----|-----|
| LAYER 1 | 0   | 7   | 14  | 21  | 168  | 175 | 182 | 189 | 336  | 343 | 350 | 357 |
| LAYER 2 | 28  | 35  | 42  | 49  | 196  | 203 | 210 | 217 | 364  | 371 | 478 | 385 |
| LAYER 3 | 56  | 63  | 70  | 77  | 224  | 231 | 238 | 245 | 392  | 399 | 406 | 413 |
| LAYER 4 | 84  | 91  | 98  | 105 | 252  | 259 | 266 | 273 | 420  | 427 | 434 | 441 |
| LAYER 5 | 112 | 119 | 126 | 133 | 280  | 287 | 294 | 301 | 448  | 455 | 462 | 469 |
| LAYER 6 | 140 | 147 | 154 | 161 | 308  | 315 | 322 | 329 | 476  | 483 | 490 | 497 |

|         | 0°  |     |     |     | 120° |     |     |     | 240° |     |     |     |
|---------|-----|-----|-----|-----|------|-----|-----|-----|------|-----|-----|-----|
| LAYER 1 | 1   | 8   | 15  | 22  | 169  | 176 | 183 | 190 | 337  | 344 | 351 | 358 |
| LAYER 2 | 29  | 36  | 43  | 50  | 197  | 204 | 211 | 218 | 365  | 372 | 379 | 386 |
| LAYER 3 | 57  | 64  | 71  | 78  | 225  | 232 | 239 | 246 | 393  | 400 | 407 | 414 |
| LAYER 4 | 85  | 92  | 99  | 106 | 253  | 260 | 267 | 274 | 421  | 428 | 435 | 442 |
| LAYER 5 | 113 | 120 | 127 | 134 | 281  | 288 | 295 | 302 | 449  | 456 | 463 | 470 |
| LAYER 6 | 141 | 148 | 155 | 162 | 309  | 316 | 323 | 330 | 477  | 484 | 491 | 498 |

DIRECTIONAL PSEUDONOISE OFFSET ASSIGNMENT IN A CDMA CELLULAR RADIOTELEPHONE SYSTEM

BACKGROUND OF THE INVENTION

I. FIELD OF THE INVENTION

The present invention relates to radio communications. More particularly, the present invention relates to cellular radiotelephone communications in a code division multiple access system.

II. DESCRIPTION OF THE RELATED ART

Cellular radiotelephone systems enable radiotelephone subscribers to communicate with land-line telephone networks while moving through a geographical area. High density, high capacity cells in typical cellular radiotelephone systems are made up of three directional antennas centrally located in the cell. Each antenna typically radiates into a 120° sector of the cell. A number of these cells are operated by a service provider to form a cellular radiotelephone system.

The cell shapes are determined by both the radiation pattern of the antennas and the local conditions at the cell site. Cells, however, are typically idealized as hexagonal patterns since such a pattern closely approximates the ideal antenna radiation pattern.

The Federal Communications Commission (FCC) governs the use of the radio frequency spectrum, deciding which industry gets certain frequencies. Since the RF spectrum is limited, only a small portion of the spectrum can be assigned to the cellular industry. This assigned spectrum, therefore, must be used as efficiently as possible in order to allow as many frequency users as possible to access the spectrum.

Multiple access modulation techniques are some of the most efficient techniques for utilizing the RF spectrum. Examples of such modulation techniques used in the cellular industry include: time division multiple access (TDMA), frequency division multiple access (FDMA), and code division multiple access (CDMA).

CDMA modulation employs a spread spectrum technique for the transmission of information. A spread spectrum system uses a pseudorandom noise (PN) sequence that spreads the transmitted signal over a wide frequency band. This frequency band is typically substantially wider than the minimum bandwidth required to transmit the signal. The spread spectrum technique is accomplished by modulating each baseband data signal, that is to be transmitted, with a unique wide band spreading code. Using this technique, a signal having a bandwidth of only a few kilohertz can be spread over a bandwidth of more than a megahertz. Typical examples of spread spectrum techniques can be found in *Spread Spectrum Communications*, Volume I, M. K. Simon, Chap. 5, pp. 262–358.

In a CDMA-type radiotelephone system, multiple signals are transmitted simultaneously on the same frequency. A particular receiver then determines which signal is intended for that receiver by a unique spreading code in the signal. The signals at that frequency without the particular spreading code intended for that particular receiver appear to be noise to that receiver and are ignored.

Three different PN sequences, well known in the CDMA art, are used in CDMA radiotelephone systems: Walsh codes, long PN codes, and short PN codes. Each PN sequence has a different function in the system. The Walsh code is the spreading sequence used by the radiotelephone. The long PN code is a scrambling sequence used by the radiotelephone. The short PN code is used by both the radiotelephone and the base station as a co-channel identifier.

The short PN code is a 15 bit sequence that identifies each sector of each cell in the system. Since the same frequency and one PN sequence is used in the system, a different short PN offset differentiates each sector to preclude the radiotelephone from communicating with a sector that is too distant for quality communication. A more detailed explanation of the short PN offset and other aspects of CDMA communication are found in the CDMA interim specification from the Electronic Industries Association/Telecommunications Industry Association (EIA/TIA) IS-95.

The short PN offsets are typically reused throughout a CDMA cellular system in the same manner as frequencies are reused throughout an analog cellular system. The PN offsets are assigned to a cluster of cells. This cluster of cells is then reused multiple times within the cellular system. Each PN offset is not used by other nearby radiotelephones within a cluster as this would lead to interference on the channel and a reduction in signal quality. This interference is referred to in the art as co-PN offset interference.

Another type of interference experienced by cellular radiotelephone users is adjacent PN offset interference. This interference is due to the energy slipover between adjacent PN offsets.

Both types of interference affect the signal quality, referred to as the carrier to interference ratio ($C/_I$). This ratio is the signal strength of the received desired carrier to the signal strength of the received interfering carriers. A number of physical factors can also affect $C/_I$ in cellular systems: buildings, geography, antenna radiation patterns, radiotelephone traffic transmitting power, and radiotelephone traffic location within the cell.

PN offset planning is a method for optimizing offset usage, optimizing reuse distance, and reducing interference. A PN offset plan also attempts to maintain adequate reuse distance to an extent where co and adjacent PN offset interferences are acceptable while maintaining an adequate $C/_I$ margin. A $C/_I \geq 24$ dB is required by the IS-95 specification.

In order to accomplish these diverse requirements, a compromise is generally made so that the target $C/_I$ performance is acquired without jeopardizing system performance. However, the existing PN offset planning does not permit this since the reuse pattern is based on cell cluster reuse in which the antenna directivity and PN offset planning are not coordinated. As a result, they exhibit poor $C/_I$ performance.

Moreover, the conventional cluster reuse scheme inevitably reproduces the same neighbor list in co-PN sites (the neighbor list is well known in the CDMA art and is described in greater detail in IS-95). This may cause the radiotelephone to mistake a distant cell site for a near cell site since both have the same PN offset. There is a resulting unforeseen need for an improved PN offset assignment scheme to enhance $C/_I$ by coordinating PN offset reuse and antenna directivity.

SUMMARY OF THE INVENTION

The present invention encompasses a process for pseudorandom noise (PN) offset allocation in a cellular radio system. The cellular system is comprised of a plurality of cells, each cell having a directional antenna. The system is assigned a plurality of pseudorandom noise offsets.

The process of the present invention creates a group of PN offsets that is comprised of a subset of the plurality of system PN offsets. The group is then directionalized by using the group's PN offsets in a first direction in the cellular system. The offsets are reused only in that first direction.

One embodiment of this process creates three different directions within the cellular system, each direction has six different layers. The sixth layer is used twice in the same direction to create seven total layers. Different PN offset groups are assigned to the layers of each direction

DETAILED DESCRIPTION OF THE PREFERRED EMBODIMENT

The directional PN offset allocation process of the present invention reduces the number of dominating, interfering cells to enhance the pilot $^C/_I$ margin. The allocation plan is based on a group of three identical cells (101–103), driven from the center of the tri-cell group. This concept is illustrated in FIG. 1.

The tri-cell group is comprised of the three cells (101–103) and the directional antennas (111–113) in the center of the group. Each antenna (111–113) radiates into a 120° sector of the group. In this case, the 120° sector covers the entire cell (101–103). Since the hexagons are only an ideal representation of the cell structure, the antennas may not be implemented exactly in the center of the group but offset somewhat due to geography, buildings, or cell requirements.

The tri-cell group has three reuse direction axes subsequently designated as $f(0°)$, $f(120°)$, and $f(240°)$. These axes start at the 0° reference direction. The second direction is offset from the reference direction by a 120° arc. The third direction is offset from the reference direction by a 240° arc.

Figure 1:
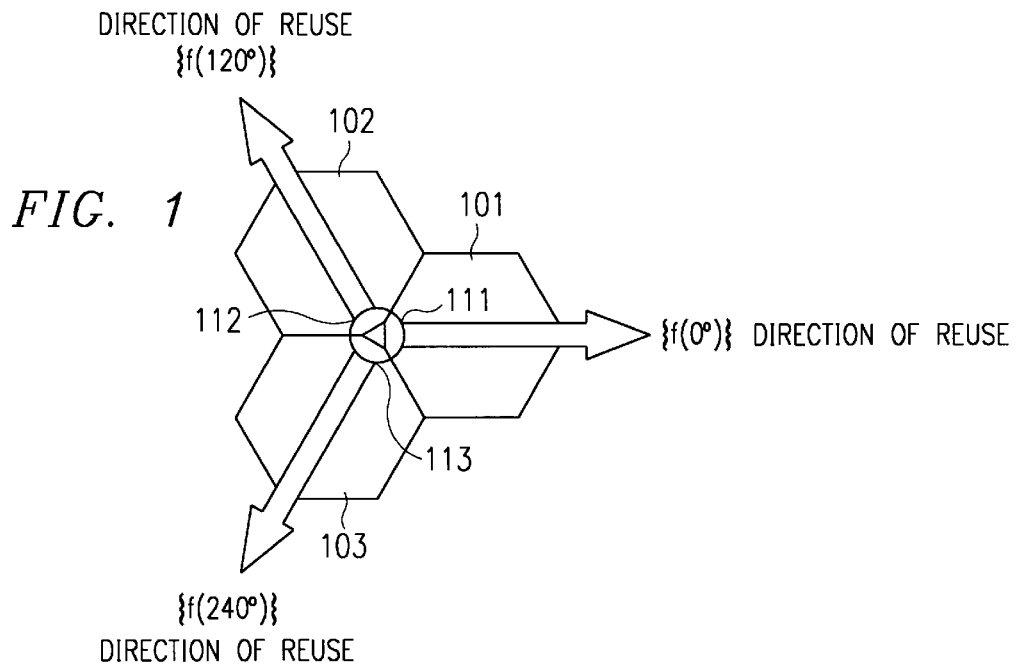
FIG. 1 shows a tri-cell group with central antenna.
Figure 2:
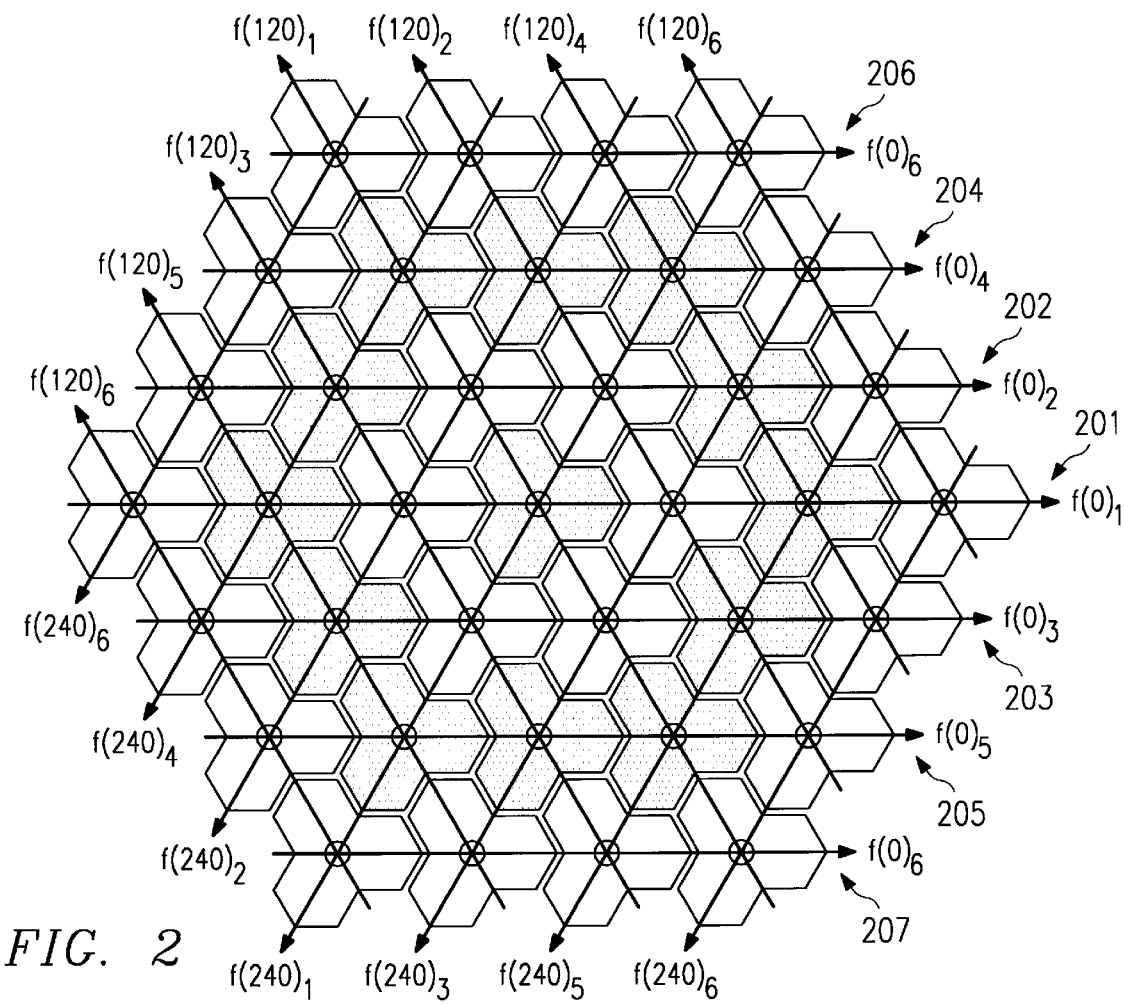
FIG. 2 shows a tri-cellular layout in accordance with the present invention.

FIG. 2 illustrates a preferred cellular layout of the present invention using the tri-cell group of FIG. 1. This layout is comprised of three axes as in the tri-cell group of FIG. 1: 0°, 120°, and 240°. These axes are extended through the entire system. Each axis is comprised of a total of seven layers; one of the layers is a duplicate of another layer on that axis. The layers are designated as follows:

$f(0°)_1, f(0°)_2, f(0°)_3, f(0°)_4, f(0°)_5, f(0°)_6$ along the 0° axis, $f(120°)_1, f(120°)_2, f(120°)_3, f(120°)_4, f(120°)_5, f(120°)_6$ along the 120° axis, $f(240°)_1, f(240°)_2, f(240°)_3, f(240°)_4, f(240°)_5, f(240°)_6$ along the 240° axis.

As illustrated in FIG. 2, the layers on each axis are laid out in the same manner. The middle layer of the $f(0°)$ axis is layer 1. The second layer (202) is adjacent to one side of layer 1. The third layer (203) is located adjacent to the opposite side of layer 1. The fourth layer (204) is located adjacent to layer 2. The fifth layer (205) is located adjacent to layer 3. In the preferred embodiment, layer 6 (206) is duplicated to also form layer 7 (207). Layers 6 (206) and 7 (207) are located adjacent to layers 4 (204) and 5 (205) respectively. This layering scheme is repeated for the other two axes ($f(120°)$ and $f(240°)$) of the cellular layout.

Alternate embodiments use other schemes for creating layers. These alternate embodiments include the one illustrated in FIG. 5. This embodiment starts with the second layer being on the opposite side of the first layer than that illustrated in the preferred embodiment of FIG. 2. In this embodiment, the layers then alternate in a manner opposite that of FIG. 2.

The directional PN offset reuse process of the present invention is based on 72 PN offset values. These values are derived from the available 512 offsets. The minimum separation between any two consecutive PN offsets is therefore 512/72=7 offsets. These offsets are then used along each layer of each axis according to the matrices illustrated in FIG. 3.

Alternate embodiments use other offset values while still maintaining the seven PN offset separation. This may be accomplished by adding one to each of the PN offset values of the matrices of FIG. 3. An example of this embodiment is illustrated in FIG. 6.

Figures 6, 7:
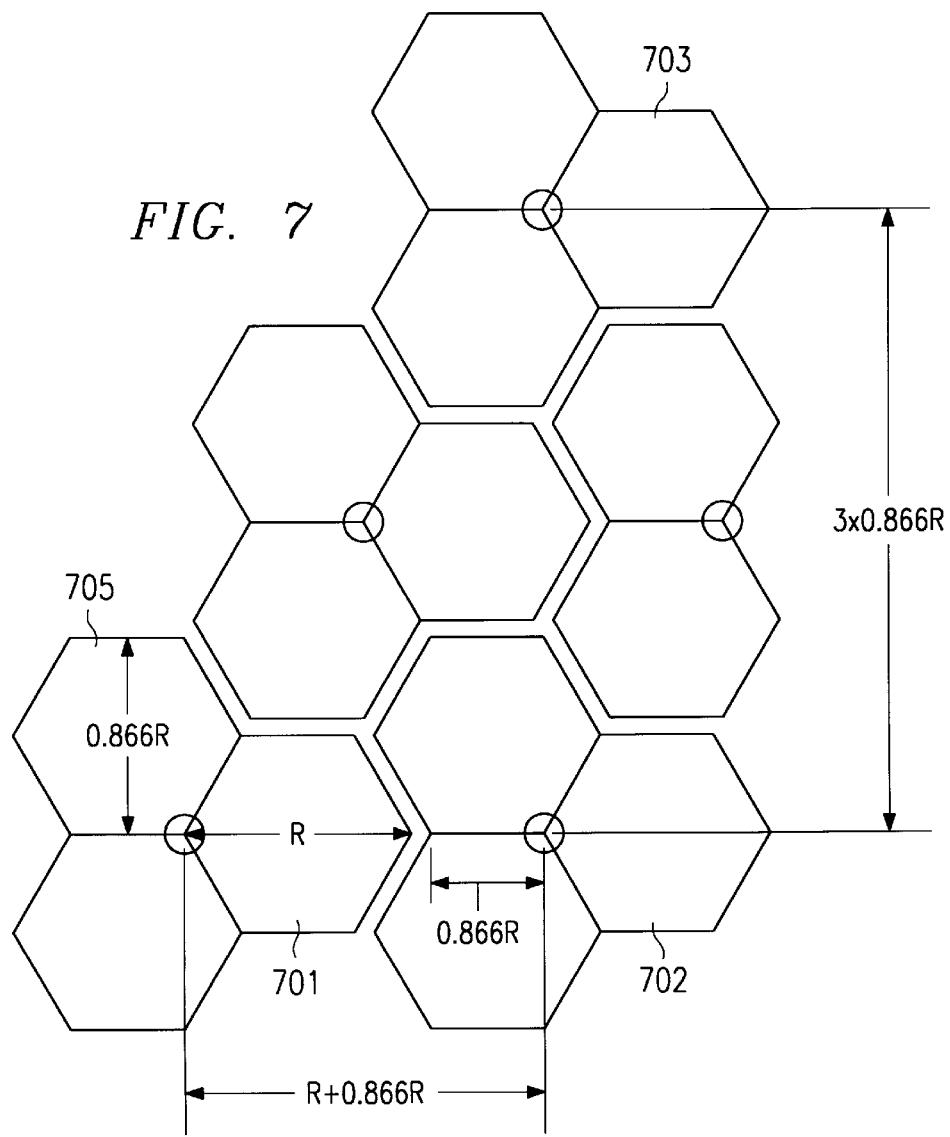
FIG. 6 shows an alternate embodiment of the pseudorandom noise offset value matrices of FIG. 3.
FIG. 7 shows an example of a method for determining multiple reuse distances in the cellular system of the present invention.

Additional embodiments are generated by adding one, for each embodiment, to each of the offsets in each matrix of FIG. 6. This process can be repeated to produce a total of 15 different matrices. At this point, all 512 available PN offsets have been exhausted.

Still other embodiments use other offset separations. This type of system, however, produces a less than optimal PN offset layout.

Figures 3, 5:
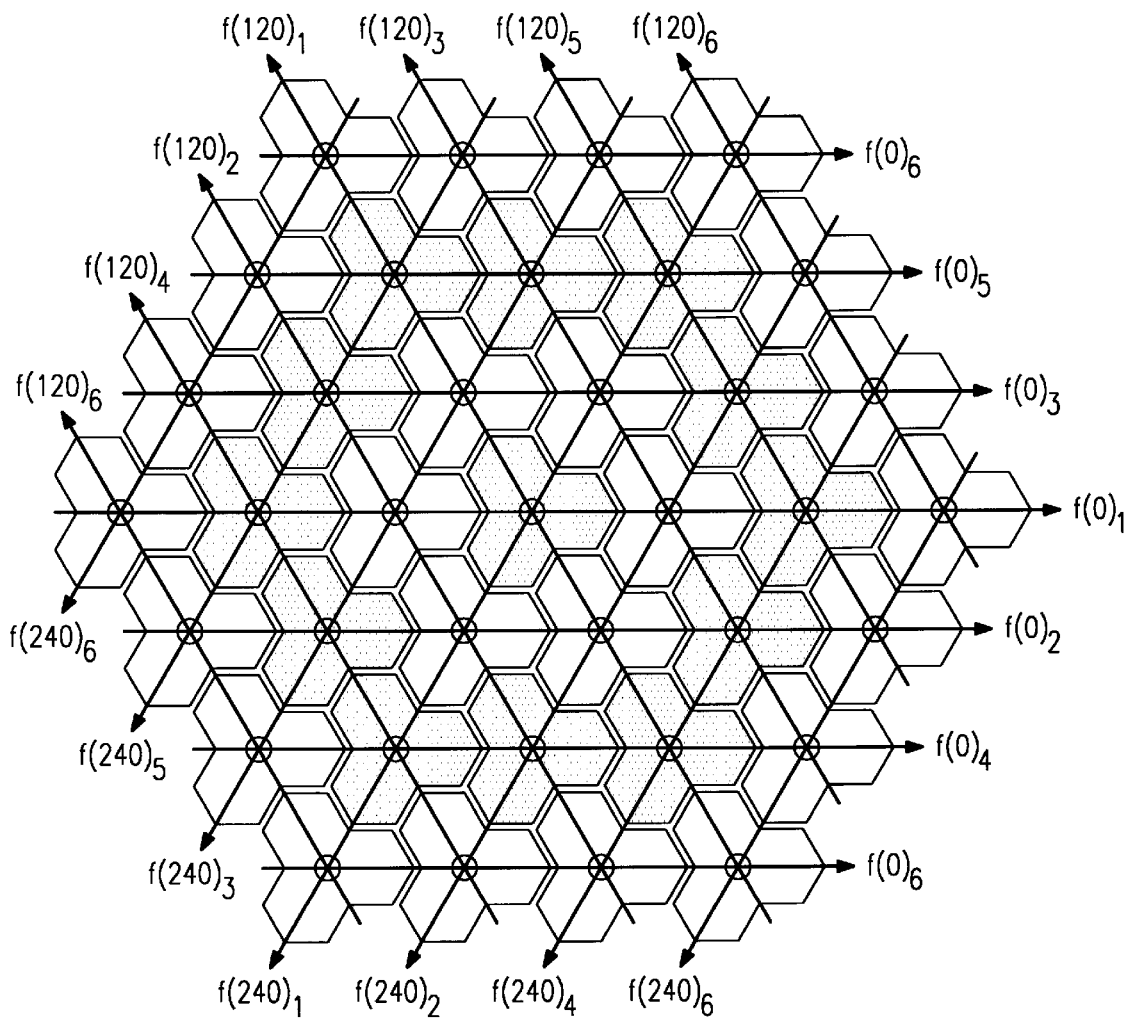
FIG. 3 shows a pseudorandom noise offset value matrix for each direction of the layout of FIG. 2.
FIG. 5 shows an alternate embodiment of the tri-cellular layout of FIG. 2.
Figure 4:
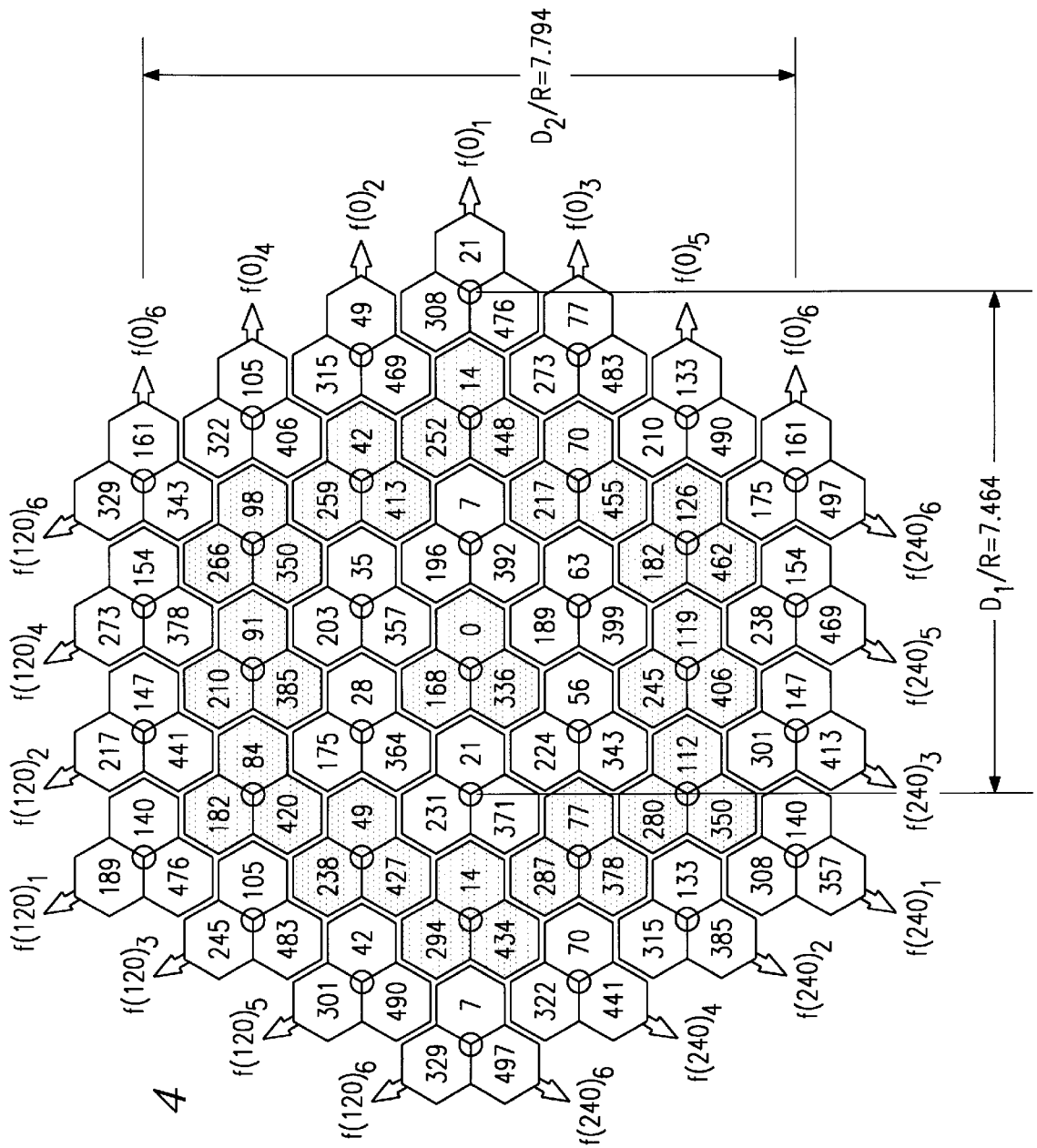
FIG. 4 shows a directionalized pseudorandom noise offset reuse plan in accordance with the offsets illustrated in FIG. 3.

The matrices of FIG. 3 are directionalized and reused as illustrated in the PN offset reuse plan of FIG. 4. The alternate embodiment matrices are directionalized and reused in a similar manner to produce additional PN offset reuse plans.

Since the cells of the present invention are excited from the corner, 120° apart, the antenna configuration and its directivity play an important role in determining system performance, such as distance between co-PN offsets and co-PN offset neighbor lists.

In a prior art cluster reuse scheme, the reuse distance between co-PN offsets is determined by the same equation used in analog cellular frequency distribution schemes: $^D/_R = \sqrt{3N}$. In this equation, $^D/_R$ is the reuse distance to cell radius ratio and N is the number of cells in a group that have different PN offsets.

If this prior art equation is applied to the system of the present invention, N is determined by dividing 72, the number of PN offsets available per system, by 3, the number of sectors available per cell to which a PN offset can be assigned. In other words, N=24. Substituting 24 into the $^D/_R$ equation results in $^D/_R = 8.485$.

However, since the PN offset allocation plan of the present invention does not use cluster reuse, the present invention provides two different reuse distances. Additionally, both reuse distances of the present invention are less than that obtained in the prior art cluster method. The derivation of the reuse distances of the present invention is illustrated in FIG. 7.

FIG. 7 shows that the radius of a cell (701) along one axis is R. The radius of a cell along the 90° axis (705) is less than R or approximately 0.866R. Therefore, for illustration purposes only, if a PN offset is reused in the next cell (702) over from the first cell (701), the reuse distance is R+0.866R= 1.866R. Similarly, if the same PN offset is reused in a cell (703) up from the second cell (702), the reuse distance for the 90° out of phase cell is 0.866R×3=2.598R.

Referring to FIG. 4, $D_1$=7.646R and $D_2$=7.794R. $D_1$ is due to the PN offset reuse sites along the same axis and 180° out of phase while $D_2$ is due to the two reuse sites located at 90° out of phase with the reference axis. Evidently, there is only one dominant interferer at 180°. Additionally, the two reused sites located at 90° out of phase provide maximum isolation between these sites; they are also attractive from the engineering point of view since their beam width can be reduced to further enhance the $C/I$.

The PN neighbor lists, as is well known in the art, are used by the system to determine adjacent PN interferences. This list contains the PN offsets that are adjacent in sequence to the PN offset allocated to any one cell.

In the case of the prior art cluster reuse scheme, the neighbor list of each reused PN offset is the same. This increases the possibility of a reused PN offset in a distant cell being mistaken for the desired, closer PN offset. However, as is evident in FIG. 4, the neighbor list is different for each PN offset reuse. This eliminates the chance of mistaken identity by the radiotelephone.

With a typical antenna front to back ratio, the $C/I$ prediction equation, well known in the art, becomes:

$$C/I = 10\log\left[\frac{1}{(D_1/R)^{-\gamma} + (D_2/R)^{-\gamma}}\right]$$

where $\gamma$ is the pathloss slope, also referred to in the art as the propagation constant. The pathloss slope is the rate of decay of signal strength as a function of distance.

Pathloss slope constants are well known in the radiotelephone art. The pathloss slope increases as the environment surrounding the cells becomes more crowded with buildings and other obstructions. These values range from 2 for free space with no obstructions, 2.5 for rural areas, 3–3.5 for suburban areas, 3.5–4 for urban areas, and 4–4.5 for dense urban areas.

In the preferred embodiment, the pathloss slope is assumed to be 3.2. This results in a $C/I$=25.2 dB. Since the code division multiple access (CDMA) specification, IS-95, calls for a $C/I \geq 24$ dB, the process of the present invention produces a PN offset reuse plan that exceeds the specification.

In summary, the process of the present invention produces a PN offset reuse plan that yields an additional $C/I$ margin and enhances CDMA performance. The process reduces the number of dominant interfering cells to enhance the carrier to interference ratio. Additionally, the PN offset plan generates different neighbor lists in co-PN sites thus eliminating the possibility of a radiotelephone mistaking another cell for the desired target cell. The present invention, therefore, outperforms the existing cluster reuse plans and is well suited for CDMA cellular radio systems.

I claim:

1. A method for pseudorandom noise offset allocation in a code division multiple access cellular system, the cellular system comprising a plurality of cells and having a plurality of pseudorandom noise offsets, each cell comprising a directional antenna, the method comprising the steps of:

generating a group of pseudorandom noise offsets comprising a subset of the plurality of pseudorandom noise offsets;

directionalizing the group in a first direction in the cellular system; and reusing the group only in the first direction.

2. The method of claim 1 wherein the step of reusing further comprises assigning the group to predetermined antennas in the first direction.

3. The method of claim 1 and further including the step of the directional antennas radiating into cells in one of the first direction, a second direction, or a third direction.

4. The method of claim 3 and further including the step of creating a plurality of layers in each of the first, second, and third directions.

5. A method for pseudorandom noise (PN) offset allocation in a code division multiple access cellular system, the cellular system comprising a plurality of cells and having a plurality of pseudorandom noise offsets, each cell comprising a directional antenna, the method comprising the steps of:

generating a plurality of PN groups, each group comprising a different subset of the plurality of system pseudorandom noise offsets;

directionalizing each PN group in a different direction of a plurality of directions in the cellular system; and reusing each PN group of the plurality of subsets in a first direction.

6. The method of claim 5 wherein the step of generating the plurality of PN groups includes the step of assigning every seventh PN offset to a particular group.

7. The method of claim 6 wherein the step of assigning includes assigning a total of 72 PN offsets to each PN group.

8. A method for pseudorandom noise (PN) offset allocation in a code division multiple access cellular system, the cellular system comprising a plurality of cells and having a plurality of pseudorandom noise offsets, each cell comprising a directional antenna, the method comprising the steps of:

generating a plurality of PN groups, each group comprising a different subset of the plurality of system pseudorandom noise offsets;

directionalizing each PN group in a first, second, or third direction such that each group is radiated in a different direction from the remaining PN groups; and creating a plurality of layers in each of the first, second, and third directions, each layer comprising a subset of each PN group.

9. The method of claim 8 and further including the step of reusing PN offsets along a first layer of the plurality of layers.

10. The method of claim 8 wherein the first direction is a zero degree reference direction, the second direction is 120 degrees from the first direction, and the third direction is 240 degrees from the first direction.

11. The method of claim 8 wherein the step of creating a plurality of layers includes generating seven layers in each direction wherein one of the seven layers is equivalent to another of the seven layers.

12. The method of claim 11 wherein the step of generating seven layers includes repeating a sixth layer of the seven layers to form the seventh layer.

13. A method for pseudorandom noise (PN) offset allocation in a code division multiple access cellular system, the cellular system comprising a plurality of cells and having a plurality of pseudorandom noise offsets, each cell comprising a directional antenna, the method comprising the steps of:

forming the plurality of cells into a plurality of tri-cellular groups, each tri-cellular group comprising three cells, the plurality of tri-cellular groups having a first, second, and third direction;

generating three PN groups, each PN group comprising a different subset of the plurality of system pseudorandom noise offsets;

generating seven layers in each direction, each layer comprising a subset of each PN group, one layer of the seven layers being a duplicate of another layer of the seven layers;

assigning a first PN group to the first direction, each PN offset of the first PN group being assigned to a different cell;

assigning a second PN group to the second direction that is 120 degrees from the first direction, each PN offset of the second PN group being assigned to a different cell; and assigning a third PN group to the third direction that is 240 degrees from the first direction, each PN offset of the third PN group being assigned to a different cell.

14. A cellular radiotelephone system comprising:

a plurality of cells formed into a plurality of tri-cellular groups, each group comprised of three cells;

a plurality of directional antennas located centrally in each tri-cellular group such that each cell is driven by a directional antenna of the plurality of directional antennas; and a plurality of pseudorandom noise (PN) offsets grouped into a plurality of PN offset groups, each PN offset group comprising a different subset of the plurality of PN offsets, each PN offset group reused in a different predetermined direction than the remaining PN offset groups.

15. The system of claim 14 wherein the plurality of directional antennas are structured such that each predetermined direction is comprised of seven layers of PN offset groups, the seventh layer being equivalent to another layer in that predetermined direction.

16. A method for pseudorandom noise offset allocation in a code division multiple access cellular system, the cellular system comprising a plurality of cells and having a plurality of pseudorandom noise offsets, each cell comprising a directional antenna, the method comprising the steps of:

generating a plurality of pseudorandom noise groups, each group comprising a different subset of the plurality of system pseudorandom noise offsets; and assigning each pseudorandom noise group to a group of cells such that a neighbor list for a first use of each pseudorandom noise offset is different than a neighbor list for a reuse of each pseudorandom noise offset.

* * * * *